W. FOSTER.
RECIPROCATING MECHANISM AND SYSTEM OF MOTOR CONTROL THEREFOR.
APPLICATION FILED FEB. 11, 1913. RENEWED MAR. 19, 1917.

1,252,897.

Patented Jan. 8, 1918.

Witnesses:

W. Foster,
Inventor
By Duell, Warfield & Duell
Attorneys

UNITED STATES PATENT OFFICE.

WALTER FOSTER, OF PLAINFIELD, NEW JERSEY, ASSIGNOR TO NILES-BEMENT-POND COMPANY, OF NEW YORK, N. Y., A CORPORATION OF NEW JERSEY.

RECIPROCATING MECHANISM AND SYSTEM OF MOTOR CONTROL THEREFOR.

1,252,897.    Specification of Letters Patent.    Patented Jan. 8, 1918.

Application filed February 11, 1913, Serial No. 747,641. Renewed March 19, 1917. Serial No. 155,941.

*To all whom it may concern:*

Be it known that I, WALTER FOSTER, a a citizen of the United States, residing at Plainfield, in the county of Union and State of New Jersey, have invented certain new and useful Improvements in Reciprocating Mechanism and Systems of Motor Control Therefor, of which the following is a full, clear, and exact description, such as will enable others skilled in the art to which it appertains to make and use the same.

The invention relates to mechanisms having reciprocating tables and reversing motors connected with the tables to drive them.

One of the objects of the invention is to provide a mechanism of this class having improved means for effecting the dynamic braking of the motor automatically upon the operation of a circuit breaker.

A further object of the invention is the provision of an efficient system of control in which many of the dangers attendant upon the use of motor-operated machines are eliminated.

Another object is the provision of reliable means for stopping a motor quickly and independently of any external power.

Another object is the provision in a motor control of a simple, inexpensive and durable braking device.

Another object is the provision of an automatic brake which is compensated to the proper extent for certain variations in the speed of the motor at the time the brake is applied.

Other objects will be in part obvious, and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
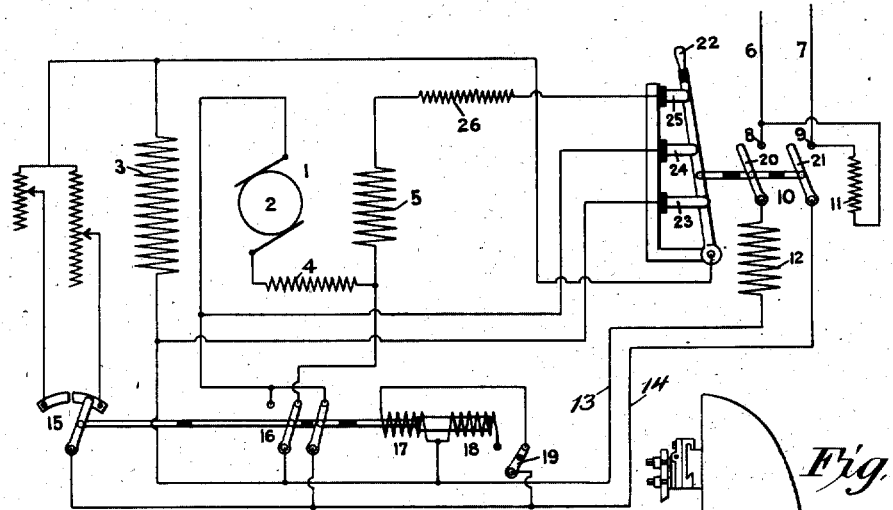
Figure 3:
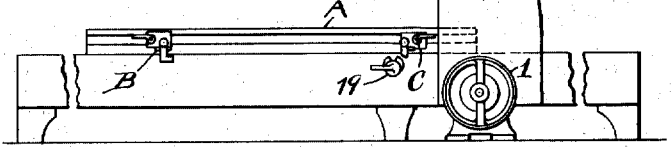
Figure 2:
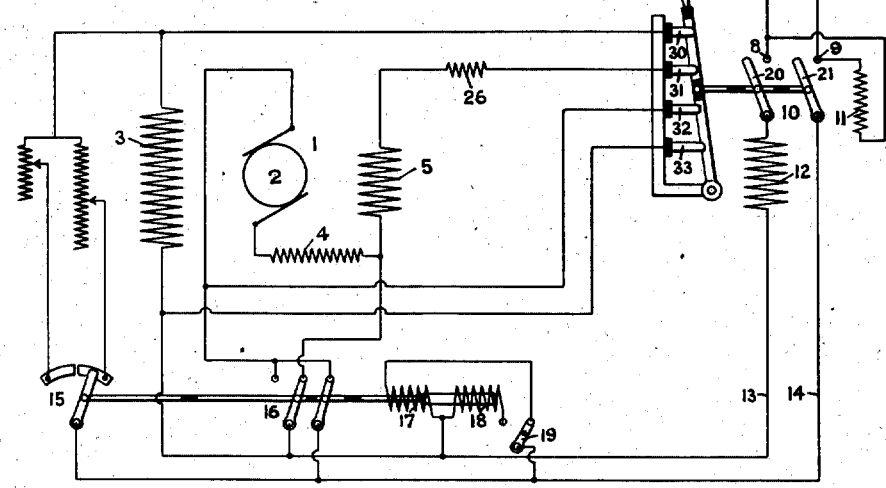

In the drawings, in which are illustrated one or more of various possible embodiments of the several features of the invention, Figure 1 represents diagrammatically a system of motor control wherein, among other things, the shunt field is adapted to be short-circuited upon itself;

Fig. 2 illustrates diagrammatically another system of motor control in which the dynamic current from the armature may be caused to pass through the shunt field and Fig. 3 is a conventional representation of a machine of the kind with which or as a part of which my improved system of motor control is primarily adapted to be used.

Similar reference characters refer to similar parts throughout both views of the drawings.

Referring now to the apparatus illustrated in Fig. 1, there is shown at 1 a motor comprising an armature 2, a shunt field 3, one or more interpole windings 4 and a second winding 5 for emergency use, hereinafter referred to as the "auxiliary" field winding. The latter winding, which consists of a few turns of comparatively heavy wire, may comprise part or all of the series turns provided with an ordinary compound motor; or the winding 5 may be laid over the field coils of an ordinary shunt motor; or part of this auxiliary winding 5 may be used in the regular service of the motor as a series field, aiding or opposing the shunt field. However in order to avoid encumbering the patent with the description of a large number of possible embodiments of this and other features of the invention, the illustration has been confined to a motor which in ordinary operation runs without a series field. The motor receives its power from an external source, through, in the present instance, two line wires, 6, 7, connected with fixed terminals 8, 9 of the double-pole circuit breaker 10. This circuit breaker 10 is provided with a no-voltage release coil 11 connected across the line wires 6, 7, and with an overload release coil 12. The coil 12 is adapted, as shown, to receive the current passing through one of the mains 13, 14, which supply current to the shunt-field switch 15, to the armature switch 16, and to the oppositely acting switch-operating solenoids 17, 18 controlled by the pilot switch 19. These switches 15, 16, 19 and solenoids 17, 18 illustrate conventionally a service controller adapted, upon a manual or automatic shifting of a pilot switch, to reverse the direction of current through the armature 2 and simultaneously change the speed of the motor as by increasing or decreasing the value of the resistance in series with the shunt field 3. In practice the service controller may be of any approved type, manually or automatically operated, for a reversing or non-reversing motor, and with or without a dynamic or other braking device. The controller, however, preferably takes the form set forth in the patent to Samuel H. Keefer, No. 1,003,269, granted September 12, 1911.

In various types of apparatus where it is important that the driven element should not travel beyond a predetermined point or points, there has been need of an economical, reliable, and efficient means for bringing the driven element quickly to a stop without undue strains of an electrical or mechanical nature, upon a failure of external power at the motor from any one of a number of causes. Such means is provided in the illustrated embodiment of the present invention as follows: In mechanical or electrical connection with the movable elements 20, 21 of the circuit breaker 10 which opens upon an overload or a failure of external power is a movable switch blade or other device 22 adapted to contact simultaneously, or preferably as illustrated, successively as a step-switch, with the stationary members 23, 24, 25. The blade 22 and the stationary members 23, 24, 25 may be connected in a variety of ways with the several parts of the motor. The connections illustrated by way of example are, from the blade 22 to one side of the shunt field 3; from the first member 23 to the other side of the shunt field 3; from the second member 24 to one side of the armature 2; and from the third stationary member 25 to the other side of the armature 2 through an ohmic resistance 26, the auxiliary winding 5 and the interpole winding 4. The resistance 26 is so proportioned as to limit the maximum emergency braking current through the armature 2, interpole winding 4 and auxiliary winding 5, to a safe value and thus avoid excessive electrical or mechanical shocks to the apparatus. The inclusion of some or all of the interpole windings in this emergency braking circuit insures good commutation for the dynamic current.

In Fig. 3 I have shown a machine with which the motor and system of control therefor shown in Fig. 1 may be used. The machine comprises a reciprocating table A which is suitably connected with the motor 1 to be driven thereby. Secured to the table are devices such as the dogs B and C adapted to engage the pilot switch 19 and move it first in one direction and then in the other direction as the table reciprocates. In this way the motor is caused to periodically reverse.

If the driven element is a reciprocating table such as that illustrated at A, or if for some other reason the motor is in service required to run first in a forward direction and then in a reverse direction it is often desirable to have, for example, the return stroke made at a higher speed than the forward stroke, and the usual method of varying the speed of the motor is by having the shunt field current stronger on the forward stroke. In such a case if the braking action were sufficiently powerful on the return stroke the collapse of the greater flux when the shunt field was short-circuited during the forward stroke would be liable to injure or break the gearing; in other words, the flux due to the shunt field on the forward stroke would be too great. Now it will be noticed that in the illustrated embodiment of the present invention the current in the auxiliary winding 5 flows in one direction if the circuit breaker 10 opens while the motor is on one stroke and flows in the opposite direction if the motor is rotating in the opposite direction when the circuit breaker 10 opens; and by connecting the windings so that on the slower stroke the auxiliary winding 5 is energized will oppose the shunt field 3, this auxiliary winding 5 will if energized on the faster stroke aid the shunt field 3 and thereby cause the braking effect to be compensated for the difference in speed of the motor on the two strokes.

In Fig. 2, the shunt field 3 instead of being short-circuited upon itself on the opening of the circuit-breaker 10 is at such a time energized by dynamic current from the rotating armature 2. This may be accomplished by making the movable switch blade 27, attached to the main switch elements 20, 21 of the circuit-breaker, of two relatively insulated sections 28, 29 adapted to make contact with the stationary members 30, 31, and 32, 33, respectively. The uppermost and lowermost stationary members 30, 33 are shown as connected to the two sides of the shunt field 3 and the other members, 31, 32, to the series circuit containing the armature 2, interpole windings 4, auxiliary winding 5, and ohmic resistance 26. The resistance 26 should be smaller than in Fig. 1, and may even be superfluous, and the auxiliary winding 5 may likewise in this case be dispensed with if desired.

Stated briefly, the embodiment illustrated in Fig. 1 comprises a motor 1, controller for regular service, circuit-breaker 10 with overload and no-voltage release, and means for braking the motor 1 upon a failure of external power at the motor. At such a time the circuit-breaker 10 opens, thereby short-circuiting the shunt field 3 and closing a series circuit containing the armature 2, interpole winding 4, an auxiliary field winding 5 and an ohmic resistance 26. If the motor is required to run in two directions at different speeds with a variable-field method of speed regulation, the braking effect of the auxiliary winding 5 added to that of the shunt field 3 on the faster stroke and subtracted from the effect of the shunt field on the slower stroke compensates for the inequality in braking efficiency due to the short-circuiting of a weaker shunt field on the faster stroke. In Fig. 2 the shunt field 3 is not short-circuited upon itself, but is energized during the emergency braking operation by dynamic current from the armature 2.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. The combination of a reciprocating table, a reversing electric motor for driving the table, a table operated switch for controlling the motor to periodically reverse it, and means automatically operable upon the failure of external power for dynamically braking the motor and for causing the power of the braking action to be greater for one direction of motor rotation than for the other.

2. The combination of a reciprocating table, a reversing electric motor for driving the table, a table operated switch for controlling the motor to periodically reverse it and cause it to run faster in one direction than in the other, and means automatically operable upon the failure of external power for dynamically braking the motor and for causing the braking action to be greater for rotation at the faster speed than for the rotation at the slower speed.

3. The combination of a reciprocating table, a reversing electric motor for driving the table, a table operated switch for controlling the motor to periodically reverse it, an automatic circuit breaker, and means dependent on the operation of the circuit breaker for dynamically braking the motor and for causing the braking action to be greater for one direction of motor rotation than for the other.

4. In a system of motor control, in combination, a motor, means connecting the motor to a source of external power, means adapted upon a failure of external power to brake the motor, and means whereby the braking force is compensated for the direction of rotation of the motor at the time the brake is applied.

5. In a system of motor control, in combination, a motor, means connecting the motor to a source of external power, means adapted upon a failure of external power to brake the motor, and means whereby the braking force is compensated for the speed of the motor at the time the brake is applied.

6. In a system of motor control, in combination, a motor, means connecting the motor to a source of external power, means adapted upon a failure of external power to brake the motor, and means whereby the braking force is compensated for the direction of rotation of the motor at the time the brake is applied.

7. In a system of motor control, in combination, a motor, means connecting the motor to a source of external power, and means adapted upon a failure of external power to short-circuit a field winding of the motor.

8. In a system of motor control, in combination, means connecting the motor to a source of external power, means adapted upon a failure of external power to brake the motor, and means whereby the braking flux is compensated for the speed of the motor at the time the braking is applied.

9. In a system of motor control, in combination, a motor, means connecting the motor to a source of external power, and means adapted upon a failure of external power to short-circuit a field winding of the motor and to close a circuit comprising the armature.

10. In a system of motor control, in combination, a motor, means connecting the motor to a source of external power, and means adapted upon a failure of external power to short-circuit a field-winding of the motor and to close a circuit comprising the armature and an interpole winding.

11. In a system of motor control, in combination, a motor, means connecting the motor to a source of external power, and means adapted upon a failure of external power to short-circuit a field winding of the motor and to close a circuit comprising the armature and another field winding.

12. In a system of motor control, in combination, a motor, means connecting the motor to a source of external power, and means adapted upon a failure of external power to short-circuit a field winding of the motor and to close a circuit comprising the armature, an interpole winding and another field winding.

13. In a system of motor control, in combination, a motor, means connecting the motor to a source of external power, and means adapted upon a failure of external power to short-circuit a field winding of the motor and to close a circuit comprising the armature, an interpole winding, another field winding and a resistance.

14. In a system of motor control, in combination, a motor, means connecting the motor to a source of external power, means adapted upon a failure of external power to short-circuit a field winding of the motor, and means whereby the flux due to the short-circuiting of said winding is increased or diminished by a second flux, according to the speed of the motor at the time the power fails.

15. In a system of motor control, in combination, a motor, means connecting the motor to a source of external power, means adapted upon a failure of external power to short-circuit a field winding of the motor, and means whereby the flux due to the short-circuit of said winding is increased or diminished by a second flux, according to the direction of rotation of the motor at the time the power fails.

16. In a system of motor control, in combination, a motor, means connecting the motor to a source of external power, and means adapted upon a failure of external power to short-circuit a field winding and thereafter to close a circuit comprising the armature.

17. In a system of motor control, in combination, a motor, means connecting the motor to a source of external power, and means adapted upon a failure of external power to short-circuit a field winding and thereafter to close a circuit comprising the armature and an interpole winding.

18. In a system of motor control, in combination, a motor, means connecting the motor to a source of external power, and means adapted upon a failure of external power to short-circuit a field winding and thereafter to close a circuit comprising the armature and another field winding.

19. In a system of motor control, in combination, a motor, means connecting the motor to a source of external power, and means adapted upon a failure of external power to short-circuit a field winding and thereafter to close a circuit comprising the armature, an interpole winding and another field winding.

20. In a system of motor control, in combination, a motor, means connecting the motor to a source of external power, and means adapted upon a failure of external power to short-circuit a field winding and thereafter to close a circuit comprising the armature, an interpole winding, another field winding and a resistance.

21. In a system of motor control, in combination, a motor, a circuit breaker provided with a no-voltage and an over-load release, and a step-switch operated upon the opening of said circuit breaker for short circuiting a field winding of the motor and thereafter closing a circuit comprising the armature of the motor.

22. In a system of motor control, in combination, a motor, and means adapted upon a failure of external power to short circuit a field winding of the motor and thereafter close a circuit comprising the armature, said means comprising a circuit-breaker and a step-switch adapted to be closed upon the opening of said circuit-breaker.

23. In a system of motor control, in combination, a motor, and means adapted upon a failure of external power to short-circuit a field winding of the motor and thereafter close a circuit comprising the armature and an interpole winding, said means comprising a circuit-breaker and a step-switch adapted to be closed upon the opening of said circuit-breaker.

24. In a system of motor control, in combination, a motor, and means adapted upon a failure of external power to short-circuit a field winding of the motor and thereafter close a circuit comprising the armature and another field winding, said means comprising a circuit-breaker and a step-switch adapted to be closed upon the opening of said circuit-breaker.

25. In a system of motor control, in combination, a motor, and means adapted upon a failure of external power to short-circuit a field winding of the motor and thereafter close a circuit comprising the armature, an interpole winding and another field winding, said means comprising a circuit-breaker and a step-switch adapted to be closed upon the opening of said circuit-breaker.

26. In a system of motor control, in combination, a motor, and means adapted upon a failure of external power to short-circuit a field winding of the motor and thereafter close a circuit comprising the armature, an interpole winding, another field winding and a resistance, said means comprising a circuit-breaker and a step-switch adapted to be closed upon the opening of said circuit-breaker.

In testimony whereof I affix my signature, in the presence of two witnesses.

WALTER FOSTER.

Witnesses:
GEORGE E. GREENLEAF,
J. T. MACMURRAY.